United States Patent [19]

Saito

[11] 4,427,361
[45] Jan. 24, 1984

[54] SHUT-OFF NOZZLE FOR INJECTION MOULDING OF THERMOPLASTICS

[76] Inventor: Toshio Saito, Sawada Office, 1-9-5-1001 Kudan Kita, Chiyoda-ku, Tokyo 102, Japan

[21] Appl. No.: 361,588

[22] Filed: Mar. 24, 1982

[51] Int. Cl.³ .............................. B29F 1/03; B29F 1/08
[52] U.S. Cl. .................................. 425/549; 425/563; 425/564
[58] Field of Search ................. 425/563, 549, 564

[56] References Cited

U.S. PATENT DOCUMENTS

| | | | |
|---|---|---|---|
| 3,095,609 | 7/1963 | Lievre | 425/563 |
| 3,871,805 | 3/1975 | Jacobs | 425/563 X |
| 3,954,209 | 5/1976 | Ramond | 425/563 X |

FOREIGN PATENT DOCUMENTS

| | | | |
|---|---|---|---|
| 2352050 | 4/1975 | Fed. Rep. of Germany | 425/563 |
| 55-146723 | 11/1980 | Japan | 425/563 |

*Primary Examiner*—Thomas P. Pavelko
*Attorney, Agent, or Firm*—Kane, Dalsimer, Kane, Sullivan and Kurucz

[57] ABSTRACT

A shut-off nozzle for injecting molten resin into a mould cavity comprises a cylinder to be connected to a moulding machine, a nozzle head attached to the front end of the cylinder to be connected to a mould, a flow path for molten resin through the cylinder and the nozzle head, a torpedo disposed in the flow path, and a shut-off pin protruding from the front end of the torpedo. The torpedo is of a streamline shape and is divided into a front portion having a hole and a rear portion having a cavity. A spring is disposed in the cavity applying forward force onto the shut-off pin. The cross sectional area of the shut-off pin to accept pressure of molten resin and the force of the spring are adjusted so that the shut-off pin is in the front position until the pressure of molten resin becomes a predetermined value.

1 Claim, 2 Drawing Figures

SHUT-OFF NOZZLE FOR INJECTION MOULDING OF THERMOPLASTICS

FIELD OF THE INVENTION

This invention relates to an apparatus for injecting molten resin into a mould cavity, and more particularly to a shut-off nozzle for resins with low viscosity such as polyethylene, polypropylene, polyamide and polyacetal.

DESCRIPTION OF THE PRIOR ART

It is becoming popular in the field of moulding of thermoplastic materials to automate injection moulding process by introducing automation machines such as automatic removal machine. With a conventional nozzle, however, it is difficult to automate injection moulding process effectively because the nozzle gate often remains open when it should be closed and molten resin leaks from the gate causing drooling or stringiness which is apt to hurt mould dies.

To solve this problem, it is necessary to use an automatic nozzle which opens and closes correctly according to the injection pressure. There have been attempts to develop a nozzle which works automatically by the pressure of molten resin. But conventional shut-off nozzles have various disadvantages as follows;

A shut-off nozzle requires a strong spring resisting the high injection pressure. Therefore the nozzle necessarily becomes so cumbersome to handle, especially in case of external spring type in which spring is mounted outside the nozzle in order to utilize large and strong spring. And moreover, quality of mould products is not good because resin in the flow path of nozzle is not heated uniformly due to interruption of heat transfer from heater to the nozzle by the existence of the external spring.

As for a conventional internal spring type nozzle in which spring is mounted in the flow path of the nozzle, quality of mould products is not good because of flow stagnation of resin due to the existence of the spring in the flow path.

As for another type of conventional internal spring nozzle in which spring is mounted in a shut-off pin, the shut-off pin does not move quick enough in closing operation due to residual pressure in the resin, viscosity of the resin and mechanical friction. The slow motion of the shut-off pin causes drooling or stringiness when the nozzle should be closed. This is because that it is difficult to make strong and durable spring compared to the cross sectional area of the shut-off pin which accept the pressure of the resin.

Thus, there has been no effective shut-off nozzle although there has been strong desire for a shut-off nozzle without above mentioned disadvantages.

BRIEF SUMMARY OF THE INVENTION

The present invention is directed toward an apparatus for injecting molten resin into a mould cavity, and more particularly to a shut-off nozzle for resins with low viscosity.

Another object of this invention is to provide a shut-off nozzle to be connected between a mould machine and a mould cavity without drooling or stringiness.

Still another object of this invention is to provide a compact shut-off nozzle for injection moulding of thermoplastic materials.

A further object of this invention is to provide a durable shut-off nozzle.

A still further object of this invention is to provide a shut-off nozzle which can produce mould products of good quality by heating raw material uniformly and by eliminating stagnation of raw material in the nozzle.

Yet another object of this invention is to provide a shut-off nozzle for injecting thermoplastic materials which works automatically relying only on the pressure of molten resin applied by moulding machine and not on any external driving power or external synchronous mechanism.

Other objects, features and advantages of this invention will become apparent from the following description in conjunction with the accompanying drawings.

BRIEF DESCRIPTION OF THE DRAWINGS

Reference is now made to the drawings wherein similar components bear the same reference numerals throughout the several figures.

DETAILED DESCRIPTION

Figure 1:
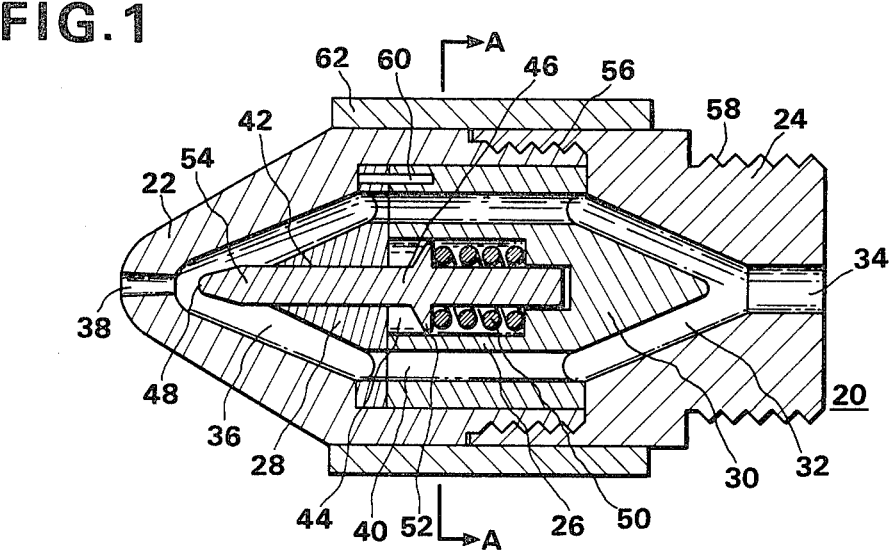
FIG. 1 is a sectional view showing the embodiment of this invention.
Figure 2:
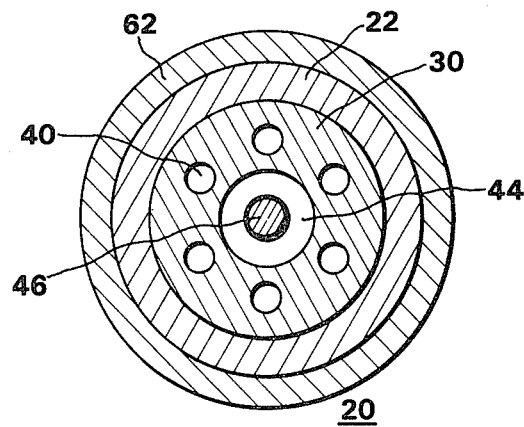
FIG. 2 is a sectional view of the embodiment of this invention cutting along the line A—A shown in FIG. 1.

In the figures, shut-off nozzle 20 comprises a nozzle head 22, a cylinder 24 and a torpedo 26. The nozzle head 22 is to be connected to an inlet of a mould cavity which is not shown in the figures. The cylinder 24 is to be connected to a mould machine which is not shown in the figures. The torpedo 26 is of a streamline shape and disposed in the cylinder 24 and the nozzle head 22.

In this description, the words 'front' and 'rear' are defined according to the flow direction of molten resin.

The cone shaped nozzle head 22 is attached to the front end of the cylinder 24 with a screw 56 threaded both on the interior surface of the front end of the cylinder 24 and the circumference of the rear end of the nozzle head 22. The circumference of the torpedo 26 is in contact with the interior surfaces of the cylinder 24 and the nozzle head 22. The front surface of the rim 56 of the torpedo 26 is in contact with the rear surface of the nozzle head 22 and the rear surface of the rim of the torpedo 26 is in contact with the front surface of the cylinder 24 when the screw 56 is tightened so that the axial movement of the torpedo 26 is cramped. This insures contact sufficient to provide efficient heat conduction from the cylinder 24 and nozzle head 22 to the torpedo 26.

The torpedo 26 is devided into a front part 28 and a rear part 30 by a plane which is perpendicular to the axis of the torpedo 26. A knock pin 60 is inserted to the both parts of the torpedo 26 to avoid relative rotation of the parts.

The interior of the cylinder 24 forms a part of flow path 32. An inlet 34 is drilled through the rear end of the cylinder 24. The inlet 34 is to be connected to a conventional moulding machine which is not shown in the figures for introducing molten resin into the flow path 32. The interior of the nozzle head 22 forms a part of flow path 36. A gate 38 is drilled through the front end of the nozzle head 22 along the axis of the nozzle head 22. The gate 38 is to be connected to an inlet of a mould cavity which is not shown in the figures for injecting molten resin into the mould cavity. A plurality of passages 40 is drilled through the torpedo 26 for interconnecting the flow path 32 of the cylinder 24 and the flow path 36 of the nozzle head 22.

A hole 42 is drilled through the front end of the front part 28 of the torpedo 26 and a cavity 44 connecting with the hole 42 is carved in the rear part 30 of the torpedo 26. A shut-off pin 46 is disposed in the cavity 44 with the front portion 54 protruding forward through the hole 42 slidably in the axial direction. The circumference of the rear portion of the shut-off pin 46 is in axially slidable contact with the interior surface of the rear portion of the cavity 44. An annular cavity is formed between the circumference of the rear part of the shut-off pin 46 and the interior surface of the cavity 44 as the diameter of the cavity 44 is larger than that of the hole 42 of which diameter is almost the same as that of the shut-off pin 46. A spring 50 is disposed in the annular cavity around the circumference of the rear portion of the shut-off pin 46. The spring 50 pushes the shut-off pin 46 forward on a flange 52 mounted on the circumference of the middle of the shut-off pin 46 for holding the shut-off pin 46 in the front position of its sliding movement.

So, when the shut-off pin 46 is in the front position of the sliding movement, the front end 48 of the shut-off pin 46 mates with the gate 38 so as to close the gate 38. And when the shut-off pin 46 is in the rear position of the sliding movement, the front end 48 of the shut-off pin 46 is apart from the gate 38 to open the gate 38.

When a molten resin is introduced from a connected moulding machine through the inlet 34, it fills the flow path 32 of cylinder 24, the passages 40 of the torpedo 26 and the flow path 36 of the nozzle head 22. The shut-off pin 46 receives two oppositely directed forces at the same time. That is, the shut-off pin 46 is pushed forward by the spring 50 in the cavity 44 while the front end 48 of the shut-off pin 46 is pushed backward by the pressure of molten resin. When a pressure of molten resin higher than a predetermined value is applied by the moulding machine, the difference of said reversely directed forces works in the end to slide the shut-off pin 46 backward against the forwardly biasing spring 50. As a result, the gate 38 opens automatically to inject the resin in the flow path to the mould cavity. This injection continues with feeding new molten resin continuously from the connected mould machine. When the pressure of the molten resin decreases, the gate 38 closes automatically.

Careful consideration should be paid in determining the cross sectional area of the front part 54 of the shut-off pin 46 which accepts the pressure of molten resin and the strength of the spring 50 in response to said predetermind pressure value for opening the gate 38.

A screw 58 is threaded on the circumference of the rear end of the cylinder 24 for installing the shut-off nozzle 20 on a conventional moulding machine which supplies molten resin.

An electric heater 62 is mounted on the circumference of the shut-off nozzle 20 to heat the resin in the nozzle uniformly.

The present invention has the advantages as follows;

1. A spring of a size larger than the diameter of the shut-off pin 46 can be utilized without contacting with molten resin, so advantages as follows are obtained;

(1) Speedy opening and closing of the gate is assured because the movement of the spring is never disturbed even when injecting resins with high viscosity.

(2) Flow stagnation of the resin due to the existence of the spring in the flow path is eliminated. This increases the quality of the moulded products.

(3) Strong spring can be used compared with the cross sectional area of the shut-off pin 46.

(4) Long lifetime of the spring is obtained.

2. The nozzle opens and closes correctly so that the flow of molten resin starts and stops correctly; and so it is easy to mould resins with high fluidity. In any case, there is no leakage of molten resin from the gate causing drooling or stringiness.

3. The gate of this invention opens or closes automatically according to the injecting pressure of molten resin applied by a conventional moulding machine. Therefore this invention requires neither external driving power nor external synchronous mechanism to activate the gate. Moreover, if abnormal pressure increase occurs resulting from thermal decomposition of the resin, the nozzle will open automatically functioning as a safety valve.

4. The gate does not open until the injection pressure of molten resin in the cylinder becomes a predetermined value, so this invention gives high initial injection pressure of resin. The molten resin is injected into the mould cavity in very short period of time. This increases the quality of the moulded products and is quite advantageous especially in moulding thin-walled products.

5. The passageway which introduces the molten resin to the gate runs through the torpedo longitudinally. Because of this structure, it is possible to obtain an extremely compact nozzle. And the torpedo and the flow path are of a streamline shape, so there is no flow stagnation in the nozzle. This increases the quality of the products.

6. The spring is mounted in the nozzle, so the heater can be mounted directly on the circumference of the nozzle to heat the molten resin in the nozzle uniformly. This increases the quality of the products.

Thus, the several aforenoted objects and advantages are most effectively attained. Although a preferred embodiment has been disclosed and described in detail herein, it should be understood that this invention is in no sense limited thereby and its scope is to be determined by that of the appended claims.

What is claimed is:

1. A shut-off nozzle for injecting molten resin comprising:

a cylinder to be connected to a moulding machine;

a nozzle head attached to the front end of said cylinder to be connected a mould and having an ejection hole;

a flow path for molten resin through said cylinder and said nozzle head;

a torpedo disposed in said flow path, having a rim disposed between said cylinder and nozzle to hold said torpedo fixed; said rim being substantially coextensive with said torpedo to provide efficient heat conduction from said cylinder and nozzle to said torpedo, said torpedo further comprising a front portion having a hole aligned with said injection hole and a rear portion, said front and rear portions defining a cavity therebetween and a spring disposed within said cavity and;

a shut-off pin protruding from the front end of said torpedo, through said hole and pushed forward by said spring by a shoulder disposed on said pin to block said ejection hole, said pin being adapted to withdraw from said ejection hole to allow the resin to flow through when a force applied on said pin by the resin pressure exceeds the spring force.

* * * * *